Sept. 21, 1965 M. PRAGER 3,207,923
STORAGE COUNTER
Filed Feb. 28, 1962

INVENTOR,
MELVIN PRAGER.
BY Jack H. Linscott
ATTORNEY.

United States Patent Office 3,207,923

Patented Sept. 21, 1965

3,207,923

STORAGE COUNTER

Melvin Prager, Palm Beach, Fla., assignor to the United States of America as represented by the Secretary of the Army Filed Feb. 28, 1962, Ser. No. 176,462

2 Claims. (Cl. 307—88.5)

This invention relates to a staircase generator, and more particularly to a storage-counter type of staircase generator.

A common type of storage counter utilizes two diodes and two capacitors to generate a staircase voltage. Unfortunately, this type of storage counter does not produce a linear output. In order to linearize the output of this diode type of storage counter one of the two above mentioned capacitors is replaced with either a Miller integrator or a bootstrap integrator. This additional circuitry appreciably increases the size and cost of the counter.

In accordance with my invention, one of the two diodes of the common diode type of storage counter is replaced by a transistor. The resultant circuit produces a linear output without the addition of an integrator circuit. Furthermore, my circuit provides greater freedom from error since each step in the stair case is the same size. In an ordinary diode storage counter each succeeding step is smaller than the preceding step.

Therefore, an object of my invention is to provide a simple storage counter circuit.

Another object of my invention is to provide a transistorized storage counter.

A further object of my invention is to provide a staircase generator having a linear output.

A still further object of my invention is to provide a staircase generator which produces steps of equal size.

These and other objects of my invention will become apparent from the following detailed description and accompanying drawings in which.

Figure 1:
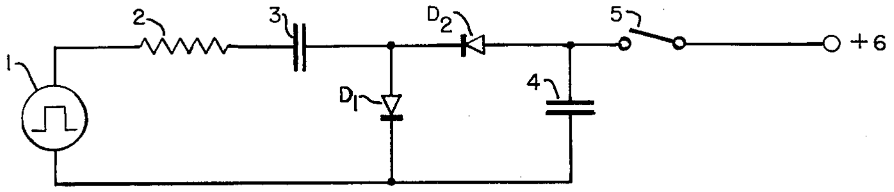
FIG. 1 shows a prior art diode storage counter.

The circuit shown in FIG. 1 is a well-known type of storage counter. An input pulse from generator 1 causes capacitor 3 to charge through resistor 2 and diode $D_1$. Resistor 2 is the generator impedance. The charging current drop through diode $D_1$ holds its anode slightly positive. Since the anode of diode $D_1$ is positive during the charging period diode $D_2$ is cut-off. If the width of the input pulse is several times longer than the time-constant of resistor 2 and capacitor 3, the voltage across capacitor 3 will be nearly equal to the amplitude of the input pulse.

When an input pulse terminates, capacitor 3 is charged with its side near the junction of diodes $D_1$ and $D_2$ negative. Thus, diode $D_1$ is cut-off and $D_2$ conducts. Diode $D_2$ will continue to conduct until the voltage across capacitor 4 is equal to the voltage across capacitor 3. The voltage across capacitor 4 will, of course, be less than the input voltage since the charge originally accumulated in capacitor 3 is now being shared by both capacitors.

If a second input pulse from generator 1 is now applied to the circuit, capacitor 3 is again charged in the manner described above. Due to the residual charge on capacitor 3 the charge acquired by this capacitor for transfer to capacitor 4 will be less than the charge acquired from the first input pulse. Thus, the voltage rise across capacitor 4 will be smaller with each succeeding input pulse and the output across capacitor 4 will be a stair case with each step being smaller than the previous step.

In order to linearize the output of the storage counter of FIG. 1, a Miller integrator or a bootstrap integrator is commonly substituted for capacitor 4. The addition of either of these integrators linearizes the output of the staircase, but the size and cost of the counter circuit are increased considerably.

Figure 2:
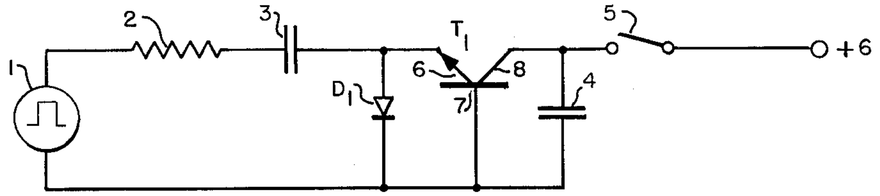
FIG. 2 shows a storage counter in accordance with my invention.
Figure 3:
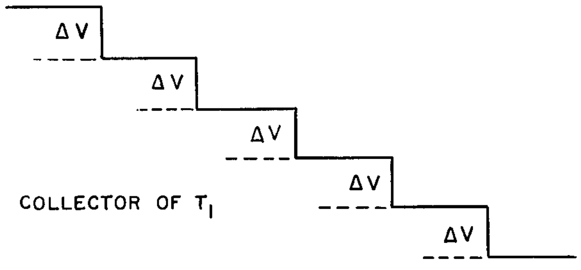
FIG. 3 is a graph of the output voltage of the circuit shown in FIG. 2.

As can be seen in FIG. 2, I have substituted transistor $T_1$ for diode $D_2$ of FIG. 1. This results in a linearized staircase without the necessity of additional complicated circuitry. The operation of the circuit shown in FIG. 2 is as follows: Capacitor 4 is charged to +6 volts by closing switch 5, then the switch is opened. After switch 5 has been opened, an input pulse from generator 1 charges capacitor 3 to a voltage less than 6 volts through resistor 2 and diode $D_1$. When the input pulse terminates capacitor 3 discharges into emitter 6 of transistor $T_1$ and capacitor 4 discharges through collector 8. The amount of charge removed from capacitor 4 by the collector circuit of transistor $T_1$ is equal to the amount of discharge of capacitor 3 through the emitter of the transistor. The amount capacitor 4 discharges ($\Delta V$) is shown in FIG. 3. Capacitor 4 now maintains a constant charge at a value of 6 volts minus ($\Delta V$). The next input pulse again charges capacitor 3. When the second input pulse terminates capacitor 4 is again discharged by an amount ($\Delta V$), the same amount as before. Thus, as is shown in FIG. 3, capacitor 4 discharges in steps of equal size. The amount of discharge for each step is determined by the ratio of capacitors 3 and 4 and the amplitude of the input pulse.

From the foregoing description it should be apparent that my invention has certain specific advantages over the prior art devices. First, my circuit linearizes the output of a storage counter by the substitution of a transistor for a diode; second, due to the isolation provided by the transistor, the output voltage swing can be considerably greater than can be obtained with the storage counter of FIG. 1; and third, in an ordinary storage counter each succeeding step is smaller, and if one of smaller steps is used to trigger some sort of pick off device, an error is more likely to result. My circuit provides greater freedom from error because each step is the same size.

While I have described my invention with reference to FIG. 2, it will be apparent to those skilled in the art that various modifications and changes can be made to the circuit described without departing from the scope of the invention; therefore, it is my intention to be limited only as indicated by the scope of the appended claims.

I claim:

1. A stair-case generator comprising an input pulse source; a first capacitor coupled to said input source; a diode having its anode connected to said first capacitor and its cathode connected to said pulse source; a transistor having an emitter connected to the anode of said diode, a base connected to the cathode of said diode, and a collector; a second capacitor connected between said collector and said base of said transistor; a source of direct current; and a switch for removably connecting said direct-current source to the junction of said collector and said second capacitor.

2. A storage counter comprising: a first charge storage device; means coupled to said first charge storage device for charging said first charge storage device to a predetermined level; a second charge storage device; means coupled to said second charge storage device for charging said second charge storage device to a charge level less than said predetermined level; and discharging means for completely discharging said second charge storage device and for partially discharging said first charge storage device, said discharging means comprising a transistor having an emitter, a base and a collector, said first charge storage device being connected between said collector and said base and said second charge storage device being connected between said emitter and said base.

References Cited by the Examiner

UNITED STATES PATENTS

| | | | |
|---|---|---|---|
| 2,584,990 | 2/52 | Dimond | 307—88.5 |
| 2,595,208 | 4/52 | Bangert | 307—88.5 XR |
| 2,873,388 | 2/59 | Trumbo | 307—88.5 |
| 2,894,150 | 7/59 | Bopp | 307—88.5 |
| 3,021,438 | 2/62 | Moore et al. | 307—88.5 |
| 3,024,368 | 3/62 | Nagy | 307—88.5 |
| 3,058,012 | 10/62 | Harling | 307—88.5 |

FOREIGN PATENTS

| | | |
|---|---|---|
| 584,260 | 9/59 | Canada. |
| 598,603 | 5/60 | Canada. |

ARTHUR GAUSS, *Primary Examiner.*